(12) United States Patent
Sui et al.

(10) Patent No.: US 11,813,937 B2
(45) Date of Patent: Nov. 14, 2023

(54) AIR FLAP APPARATUS HAVING ASYNCHRONOUSLY MOVABLE AIR FLAP ARRAYS

(71) Applicant: Röchling Automotive SE, Mannheim (DE)

(72) Inventors: Kangyu Sui, Kelsterbach (DE); Christophe Rouvet, Worms (DE)

(73) Assignee: Röchling Automotive SE, Mannheim (DE)

( * ) Notice: Subject to any disclaimer, the term of this patent is extended or adjusted under 35 U.S.C. 154(b) by 0 days.

(21) Appl. No.: 17/212,297

(22) Filed: Mar. 25, 2021

(65) Prior Publication Data

US 2021/0300174 A1 Sep. 30, 2021

(30) Foreign Application Priority Data

Mar. 31, 2020 (DE) ...................... 10 2020 108 906.6

(51) Int. Cl.
*B60K 11/08* (2006.01)
(52) U.S. Cl.
CPC ................................. *B60K 11/085* (2013.01)
(58) Field of Classification Search
CPC ........ B60K 11/085; B60K 11/08; Y02T 10/88
See application file for complete search history.

(56) References Cited

U.S. PATENT DOCUMENTS

| | | | |
|---|---|---|---|
| 8,544,581 B2 | 10/2013 | Stokes et al. | |
| 8,814,638 B2 | 8/2014 | Hasegawa et al. | |
| 9,370,995 B2 * | 6/2016 | Jeong | B62D 25/085 |
| 9,840,144 B2 * | 12/2017 | Aizawa | B60K 11/08 |
| 10,421,352 B2 | 9/2019 | Urbach | |

(Continued)

OTHER PUBLICATIONS

German Search Report for corresponding DE 10 2020 108 906.6 dated May 2, 2022, 7 pgs.

*Primary Examiner* — Kurt Philip Liethen
(74) *Attorney, Agent, or Firm* — Rankin, Hill & Clark LLP

(57) ABSTRACT

An air flap apparatus for a motor vehicle, encompassing:
 a frame having an air passthrough opening;
 a first and a second air flap arrangement each encompassing at least one first air flap and at least one second air flap;
 a common motion drive system for displacing the first and the second air flap arrangement;
 a motion coupling for coupling both the first and the second air flap arrangement to the motion drive system,
the first air flap arrangement and the second air flap arrangement being displaceable between a blocking position having a greater degree of coverage of the air passthrough opening and a passthrough position having a lesser degree of coverage of the air passthrough opening; the motion coupling coupling the first and the second air flap arrangement to the motion drive system in such a way that the first and the second air flap arrangement are drivable by the motion drive system asynchronously for a displacement motion, a coupling component of the motion coupling comprises a common motion coupling configuration that, during a shifting of the air flap apparatus, is force- and motion-transferringly coupled to the two counterpart coupling components in order to produce a displacement of the first air flap arrangement and of the second air flap arrangement.

20 Claims, 9 Drawing Sheets

(56) References Cited

U.S. PATENT DOCUMENTS

| | | | |
|---|---|---|---|
| 2005/0000491 A1* | 1/2005 | Burger | G01D 5/145 |
| | | | 123/399 |
| 2011/0232981 A1* | 9/2011 | Hori | B60K 11/085 |
| | | | 180/68.1 |
| 2013/0247862 A1* | 9/2013 | Sakai | B60K 11/085 |
| | | | 123/188.1 |
| 2015/0090508 A1* | 4/2015 | Chappex | B60K 11/085 |
| | | | 180/68.1 |
| 2018/0170170 A1* | 6/2018 | Nam | B60K 11/06 |
| 2018/0229598 A1* | 8/2018 | Lambert | B60R 19/52 |
| 2020/0130499 A1* | 4/2020 | Jeong | B60K 11/085 |
| 2021/0291641 A1* | 9/2021 | Tametani | F16H 37/041 |

* cited by examiner

AIR FLAP APPARATUS HAVING ASYNCHRONOUSLY MOVABLE AIR FLAP ARRAYS

This Application claims priority in German Patent Application DE 10 2020 108 906.6 filed on Mar. 31, 2020, which is incorporated by reference herein.

The present invention relates to an air flap apparatus for a motor vehicle, encompassing:
- a frame having an air passthrough opening;
- a first air flap arrangement encompassing at least one first air flap arranged displaceably on the frame;
- a second air flap arrangement, different from the first, encompassing at least one second air flap arranged displaceably on the frame;
- a common motion drive system for displacing the first and the second air flap arrangement;
- a motion coupling for coupling both the first and the second air flap arrangement to the motion drive system, the first air flap arrangement being displaceable between a blocking position having a greater degree of coverage of a first portion of the air passthrough opening and a passthrough position having a lesser degree of coverage of the first portion of the air passthrough opening;

the second air flap arrangement being displaceable between a closed position having a greater degree of coverage of a second portion, different from the first, of the air passthrough opening and an open position having a lesser degree of coverage of the second portion of the air passthrough opening;

the motion coupling coupling the first and the second air flap arrangement to the motion drive system in such a way that the first and the second air flap arrangement are drivable by the motion drive system asynchronously for a displacement motion between a blocking operating state in which the first air flap arrangement is in the blocking position and the second air flap arrangement is in the closed position, and a passthrough operating state in which the first air flap arrangement is in the passthrough position and the second air flap arrangement is in the open position, the motion coupling encompassing:
- a coupling component connected to an output member of the motion drive system for motion together;
- a first counterpart coupling component that is force- and motion-transferringly coupled to the coupling component and is connected to the first air flap arrangement for motion together; and
- a second counterpart coupling component that is force- and motion-transferringly coupled to the coupling component and is connected to the second air flap arrangement for motion together.

BACKGROUND OF THE INVENTION

An air flap apparatus of this kind for a motor vehicle, and a motor vehicle equipped with such an air flap apparatus, are known from DE 10 2017 222 678 A1.

The teaching of this document is to drive a shifting drum, constituting the coupling component and having control grooves on the enveloping surface, by way of the common motion drive system to rotate and, by means of control grooves and control pegs guided therein, to displace the first air flap arrangement, and the second air flap arrangement positionally offset with reference to the first, asynchronously between the aforesaid operating states. "Asynchronously" means here that the two air flap arrangements are displaced between the blocking operating state and the passthrough operating state, by operation of the motion drive system, in such a way that the first and the second air flap arrangement travel different displacement distances in identical driving time segments even though the operation of the motion drive system is uniform for the two air flap arrangements. The first and the second air flap arrangement therefore exhibit, in a plurality of intermediate operating states between the blocking operating state and the passthrough operating state, air flap positions that cover to different degrees their respective portion of the air passthrough opening.

The air flap apparatus known from DE 10 2017 222 678 A1 makes it possible to establish this state of a different coverage of the portions of the air passthrough opening which are respectively associated with the two air flap arrangements by way of a corresponding course of the two control grooves, and corresponding rotation of the shifting drum.

A disadvantage of the air flap apparatus known from DE 10 2017 222 678 A is the outlay associated with manufacture and assembly of the shifting drum that carries the control grooves.

A document that also discloses an air flap apparatus having all the features recited initially is WO 2012/161783 A2. The air flap apparatus known from WO 2012/161783 A2 corresponds in large measure to the air flap apparatus known from DE 10 2017 222 678 A1, differing in that the control grooves of the cylindrical coupling component of WO 2012/161783 A2 are embodied on its end face and not, as in DE 10 2017 222 678 A1, on the enveloping surface. As in the case of the coupling component known from DE 10 2017 222 678 A1, a separate control groove is embodied as a motion coupling configuration for each air flap arrangement. The disadvantages of the air flap apparatus, and its motion coupling, known from WO 2012/161783 A2 are therefore the same as those of the air flap apparatus known from DE 10 2017 222 678 A1.

SUMMARY OF THE INVENTION

An object of the present invention is therefore to refine the air flap apparatus recited initially in such a way that with no loss of reliability, and with less outlay in terms of manufacture and assembly than in the existing art, asynchronous displacement of the first and the second air flap arrangement for shifting the air flap apparatus between the aforesaid operating states is enabled.

The present invention achieves this object, on an air flap apparatus of the species, by the fact that the coupling component comprises a common motion coupling configuration that, during a shifting of the air flap apparatus between the blocking operating state and the passthrough operating state, is force- and motion-transferringly coupled both to the first and to the second counterpart coupling component in order to produce a displacement of the first air flap arrangement between the blocking position and the passthrough position, and to produce a displacement of the second air flap arrangement between the closed position and the open position.

In contrast to the air flap apparatuses of the existing art and their coupling components, in which a respective separate motion coupling configuration is embodied for each of two air flap arrangements, only one motion coupling configuration is therefore embodied and arranged on the air flap arrangement according to the present invention and on its coupling component, which configuration interacts both with the first counterpart coupling component and with the second counterpart coupling component in order to asynchronously displace for motion together the air flap arrangements connected to the respective counterpart coupling components.

While the asynchronicity of the displacement of the two air flap arrangements is produced in the existing art substantially by separate motion coupling configurations and their spatial arrangement relative to one another on the coupling component, with the air flap apparatus of the present invention the asynchronicity of the displacement is based less on the considerably simplified coupling component than on the conformation and/or arrangement of the air-flap-arrangement-side counterpart coupling components relative to the coupling component.

According to a first possible embodiment of the present invention, the motion coupling can be configured and arranged in such a way that during a shifting of the air flap apparatus between the blocking operating state and the passthrough operating state, i.e. during a motion of the coupling component (in whichever shifting direction), the motion coupling configuration successively comes into a force- and motion-transferring coupling engagement firstly with one counterpart coupling component from among the first and the second counterpart coupling component, and then with the respective other counterpart coupling component.

It is conceivable in this context, in principle, for the coupling engagement of the motion coupling configuration with the two counterpart coupling components to overlap in time, so that in a transition region from the coupling engagement with the one counterpart coupling component to the coupling engagement with the other counterpart coupling component, the motion coupling configuration is in coupling engagement, for a motion segment, with both counterpart coupling components simultaneously. To avoid unnecessarily high loads and/or to avoid undesired jamming that might result from such a simultaneous coupling engagement of the motion coupling configuration with the two counterpart coupling components, however, it is preferred if the coupling engagement with the one counterpart coupling component ends before the coupling engagement with the other counterpart coupling component begins. It is likewise possible for the motion coupling configuration to be in coupling engagement with neither of the counterpart coupling components in a transitional phase after the end of the coupling engagement with the one counterpart coupling component and before the beginning of the coupling engagement with the other counterpart coupling component.

The motion coupling configuration serves to transfer a motion from the common motion drive system to the two air flap arrangements. When the motion coupling configuration comes into coupling engagement successively in time with the two counterpart coupling components, that air flap arrangement whose counterpart coupling component was the first to be in coupling engagement with the motion coupling configuration, and which is no longer in coupling engagement with the motion coupling configuration toward the end of the shifting of the air flap apparatus, has an undetermined relative arrangement, influenced only by the friction occurring at the air flap apparatus, with respect to the frame of the air flap apparatus. To prevent the air flap arrangement, shifted in the coupling engagement that was earlier in time, from moving again after the end of its coupling engagement (for instance, in response to gravity) out of the target position that has already been reached, the coupling component can comprise a common blockade coupling configuration that is in a blockade engagement, which blocks a motion of the other counterpart coupling component, with that counterpart coupling component, while the motion coupling configuration is in coupling engagement with the one counterpart coupling component, and vice versa. The motion coupling configuration then serves as an active configuration for modifying a position of the air flap arrangements, and the blockade coupling configuration serves as a passive configuration for preventing a change in a position of the air flap arrangements.

In principle, the coupling component can be movable in any manner, for instance translationally, rotationally, or in a combination of translational and rotational motion. A particularly advantageous small motion space is sufficient for the coupling component when it is movable rotationally around a drive axis. For the reasons recited, the coupling component is preferably movable only rotationally around a drive axis.

In order to avoid mutual interference and impairments of their functionality, it is advantageous if the configurations that serve different purposes (motion coupling configuration and blockade coupling configuration) move in different motion spaces that, if possible, only overlap or preferably are completely different from one another. According to a preferred design solution, the separation of the motion spaces of the aforesaid configurations on a preferably rotationally movable coupling component can be achieved by the fact that the motion coupling configuration and the blockade coupling configuration are arranged behind one another along the drive axis. The two configurations can be arranged along the drive axis with an axial gap between them in order to bring about a particularly reliable separation, or can axially succeed one another with no gap in space-saving fashion.

Because the blockade coupling configuration is intended only to prevent a displacement of a counterpart coupling component during a blockade engagement with that counterpart coupling component, the blockade coupling configuration can advantageously be of simple configuration. It is sufficient, for example, if the blockade coupling configuration furnishes a blockade surface that physically prevents a displacement of the counterpart coupling component that is presently in blockade engagement. On a rotationally movable coupling component, a preferably simple but effective blockade coupling configuration comprises a cam surface that is, in portions, rotationally symmetrical with respect to a rotational symmetry axis. The cam surface preferably does not extend entirely around the rotational symmetry axis in order to secure, during a rotation of the coupling component, motion segments of the coupling component in which a blockade engagement with the first or the second counterpart coupling component cannot occur. The drive axis is the rotational symmetry axis, so that the cam surface is always at the same distance from the drive axis and so that during a rotation of the coupling component, a body abutting against it cannot become radially displaced. In order also to prevent a transfer of axial forces and motions by the cam surface, the cam surface is preferably embodied to be mirror-symmetrical with respect to a mirror-symmetry plane that is orthogonal to the drive axis and constitutes the rotational symmetry axis. In the simplest case the cam surface can be a partly cylindrical surface, or it can be a positive or negative partially toric cam surface, to mention only a few examples. If axial forces acting between the cam surface and a body abutting slidingly against it are desired or immaterial, the cam surface can also be embodied as a partly conical surface, or as one that in general tapers along the drive axis.

It is sufficient when each of the two counterpart coupling components comprises at least one respective counterpart blockade configuration that is in abutting engagement with the cam surface during a blockade engagement with the blockade coupling configuration. The counterpart blockade configuration can be a peg or projection that abuts over a small abutment area against the cam surface during blockade engagement. In order to avoid undesirably high contact pressures between the blockade coupling configuration and counterpart blockade configuration, the counterpart blockade configuration can have a contact surface embodied complementarily to the cam surface. That contact surface can be in sliding abutting engagement with the cam surface during blockade engagement.

The motion coupling configuration can encompass a projection and/or a recess. This can be sufficient especially in a context of translational motion of the motion coupling configuration. Even in a context of rotational motion of the motion coupling configuration, a single projection and/or a single recess can be sufficient if the respective projection or recess has a sufficient length of extent radially with respect to the drive axis to hold the respective counterpart coupling component in a coupling engagement for a sufficient length of time. The motion coupling configuration preferably has a plurality of projections that are arranged successively along their intended motion path with a spacing from one another. Particularly preferably, the motion coupling configuration encompasses a sector gear extending along an angle sector around the drive axis.

A counterpart motion configuration, embodied for coupling engagement with the motion coupling configuration, on at least one of the two counterpart coupling components, preferably on each of the counterpart coupling components, can accordingly also, in principle, comprise at least one projection and/or at least one recess. In order to be able to come into an advantageous meshing coupling engagement with the preferred conformation of the motion coupling configuration as a sector gear, each counterpart coupling component preferably comprises a tooth set as a counterpart motion configuration. The tooth set can be embodied on a gear, once again a sector gear, or on a toothed rack. Because the counterpart coupling components are preferably provided translationally movably on the motion coupling, the embodiment of the tooth set on a toothed rack is likewise preferred.

Because the shifting of the two air flap arrangements, in one case between a closed position and a passthrough position, and in one case between a closed position and an open position, preferably requires the same displacement travel in each case, the angular extent of the cam surface around the drive axis is preferably at least equal to the angular extent of the tooth set of the sector gear around the drive axis. But because the cam surface is intended to come into blockade engagement respectively with different counterpart coupling components in different rotation directions, the angular extent of the cam surface around the drive axis is preferably greater than the angular extent of the tooth set, particularly preferably at least twice as great. Because of the advantageous provision of a blockade engagement in opposite rotation directions of the rotationally movable coupling component, one portion of the cam surface is preferably respectively located on either side, in a circumferential direction around the drive axis, of the sector gear or of its tooth set. In the interest of simple manufacture, the cam surface extends over the entire angular region in which no tooth set of the sector gear is present.

The cam surface can also extend in an angular region in which a tooth set of the sector gear is also present, provided the cam surface and the sector gear occupy different motion spaces as discussed above. In principle, the spatial arrangement of the sector gear and the cam surface relative to one another depends on the arrangement of the two counterpart coupling components and of the counterpart motion configuration and counterpart blockade configuration respectively provided thereon. Because the counterpart motion configuration and counterpart blockade configuration of each counterpart coupling component are preferably also located in different motion spaces, it is advantageous in terms of avoiding undesired collisions if the sector gear extends for the most part, preferably entirely, over an angular region over which the cam surface does not extend, and vice versa. The cam surface and the sector gear are arranged coaxially.

As discussed above, according to an embodiment of the present invention which is preferred in terms of design, the first counterpart coupling component comprises as a counterpart blockade configuration a first counterpart cam surface for abutting engagement with the cam surface, and comprises as a counterpart motion configuration a first tooth set for meshing engagement with the sector gear. Also preferably, the second counterpart coupling component comprises as a counterpart blockade configuration a second counterpart cam surface for abutting engagement with the cam surface, and comprises as a counterpart motion configuration a second tooth set for meshing engagement with the sector gear. For a distinct and definite separation of the coupling engagements of the sector gear with the two tooth sets, the first and the second tooth set are preferably arranged on different sides of the drive axis. In principle, the tooth set can be embodied on a rotationally movable gear. To avoid an excessive number of further mechanisms for motion transfer, however, the tooth sets are preferably each embodied rigidly on their counterpart coupling components, the counterpart coupling components preferably being movable translationally, particularly preferably movable only translationally. Depending on the length of the motion path of the counterpart coupling components, they can be arranged tiltedly relative to one another. In order to avoid undesired collisions and to make use of maximally long motion paths of the counterpart coupling components, the counterpart coupling components are preferably arranged movably along parallel motion paths.

According to a second alternative embodiment of the present invention, the motion coupling configuration can be embodied in such a way that it is in a force- and motion-transferring coupling engagement both with the first and with the second counterpart coupling component during much of the time span, preferably during the entire time span, of the shifting of the air flap apparatus between the blocking operating state and the passthrough operating state.

This can be achieved in terms of design by the fact that the motion coupling configuration comprises a cam that is movable along a predetermined cam path and that engages into a respective gate path of both the first and the second counterpart coupling component.

The ratio of the conformation or course of the gate path to the course of the cam path determines the motion, executed during a motion of the cam relative to the gate path, of the counterpart coupling component carrying the gate path. Each gate path therefore preferably comprises a standstill portion whose course corresponds to that portion of the course of the cam path which the cam passes through during its engagement with the standstill portion. As long as the cam is located in the standstill portion of the gate path, a cam motion not only produces no motion of the counterpart coupling component carrying the gate path. By suitable conformation of the gate path, for example as a groove enclosing the cam on both sides of the longitudinal cam axis or as an elongated hole of that kind, the cam that is in engagement with the standstill portion can block a motion of the counterpart coupling component carrying the standstill portion in a plane that is angled with respect to, in particular is orthogonal to, the longitudinal cam axis. The engagement of the cam of the coupling component with a standstill portion of a counterpart coupling component therefore corresponds functionally to the above-described blockade engagement.

In order to allow not only a motion blockade but in fact a targeted motion to be brought about, each gate path comprises, in addition to the standstill portion, a displacement portion whose course differs from the course of that portion of the cam path which the cam passes through during its engagement with the displacement portion. The difference between the course of the displacement portion and the course of the portion of the cam path determines the degree of displacement of the gate path due to the cam motion, and thus the displacement of the counterpart coupling component that carries the displacement portion. The engagement of the cam with a displacement portion corresponds functionally to the above-described coupling engagement.

In order to achieve the desired asynchronous motion in the context of a motion of the cam, the standstill portions of the first and the second counterpart coupling component are arranged with an offset relative to one another in such a way that the cam passes through the standstill portions successively during its motion along the cam path. This furthermore means that the displacement portions of the first and the second counterpart component are arranged with a relative offset from one another in such a way that the cam passes through the displacement portions of the two counterpart coupling components successively during its motion along the cam path.

Thus, while in the first embodiment the motion coupling configuration preferably is in coupling engagement with a counterpart motion configuration of one counterpart coupling component from among the first and the second counterpart coupling component, and preferably at the same time a blockade coupling configuration embodied separately therefrom is in blockade engagement with a counterpart blockade configuration of the respective other counterpart coupling component, in the second embodiment the cam, at least during a time segment of the shifting of the air flap apparatus between its aforesaid operating states, is simultaneously, as a motion coupling configuration, in coupling engagement with the displacement portion of the gate path of one counterpart coupling component from among the first and the second counterpart coupling component and, as a blockade coupling configuration, is in coupling engagement with the standstill portion of the gate path of the respective other counterpart coupling component, such that during the same shifting operation, at a different point in time the cam, as a blockade coupling configuration, is in blockade engagement with the standstill portion of the gate path of the one counterpart coupling component and simultaneously, as a motion coupling configuration, is in coupling engagement with the displacement portion of the gate path of the other counterpart coupling configuration.

In order to avoid undesired jamming of the motion coupling, the cam preferably enters the standstill portion of the one counterpart coupling component from among the first and the second counterpart coupling component only when it is leaving the standstill portion of the other counterpart coupling component or only after it has left the standstill portion of the other counterpart coupling component. The standstill portion thus need not be directly followed by the displacement portion, although that is preferred.

In order to obtain from the cam motion the greatest possible displacement forces and the longest possible displacement motions of the counterpart coupling components, and thus of the associated air flap arrangements, the cam preferably extends along a longitudinal cam axis extending transversely to the cam path. The longitudinal cam axis preferably extends orthogonally to the cam path. The gate paths of the first and the second counterpart coupling component can then advantageously be arranged in space-saving fashion behind one another along the longitudinal cam axis.

The cam path is preferably a circle-segment path or a circular path around a drive axis of the coupling component which, in the second embodiment as well, is preferably driven by the motion drive system to move rotationally. This can be achieved in simple fashion by way of a longitudinal cam axis that is parallel to the drive axis of the coupling component, and by way of cams arranged with a spacing from the drive axis. Each standstill portion is then preferably a circle-segment path, the angular extent of each standstill portion being less than the angular extent of the cam path around the drive axis of the coupling component, which preferably is also the drive axis of the motion drive system. The displacement portion of each gate path preferably deviates from a circle-segment path, so that a motion of the cam along the displacement portion results in a relative motion of the gate path relative to the rotation axis of the coupling component. For example, the displacement portion can be rectilinear and, for a smooth transition, can preferably adjoin, as a tangent, that longitudinal end of the standstill portion of the same counterpart coupling component which is closest to the displacement portion. Alternatively, the displacement portion can likewise be curved but with a curvature deviating from the curvature of the standstill portion, optionally also with a differing curvature direction.

In order to achieve motions of the two air flap arrangements which are asynchronous but preferably spatially symmetrical, with identical motion magnitudes, in the context of a shift of the air flap apparatus between its aforesaid operating states, the gate paths of the two counterpart coupling components are preferably embodied and arranged mirror-symmetrically with respect to a mirror-symmetry plane containing the rotation axis of the coupling component. As a rule, each gate path passes through the mirror-symmetry plane.

For maximally reliable transfer of a motion of the cam to a counterpart coupling component, the gate path is preferably defined by two mutually parallel gate walls, whether as an elongated hole or as a groove. The spacing of the two gate walls at least corresponds to the diameter of the cam or is slightly larger, so that the cam penetrates into or is received between the gate walls with a clearance fit.

An advantageously space-saving arrangement is obtained when, with respect to the longitudinal cam axis, the standstill portion of the one counterpart coupling component from among the first and the second counterpart coupling component is axially adjoined by the displacement portion of the respective other counterpart coupling component, and vice versa.

For the reasons already recited above, it is preferably the case for the second embodiment as well that the first and the second counterpart coupling component are each translationally displaceable respectively along a first and a second component path. The component paths can be tilted relative to one another, but the first and the second component path are preferably parallel or coaxial in order to achieve the longest possible motion travel.

The motion coupling preferably comprises a housing in which at least the coupling component and the two counterpart coupling components are received. The motion drive system can be mounted in space-saving fashion onto the housing of the motion coupling.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED EMBODIMENTS

Figure 1:
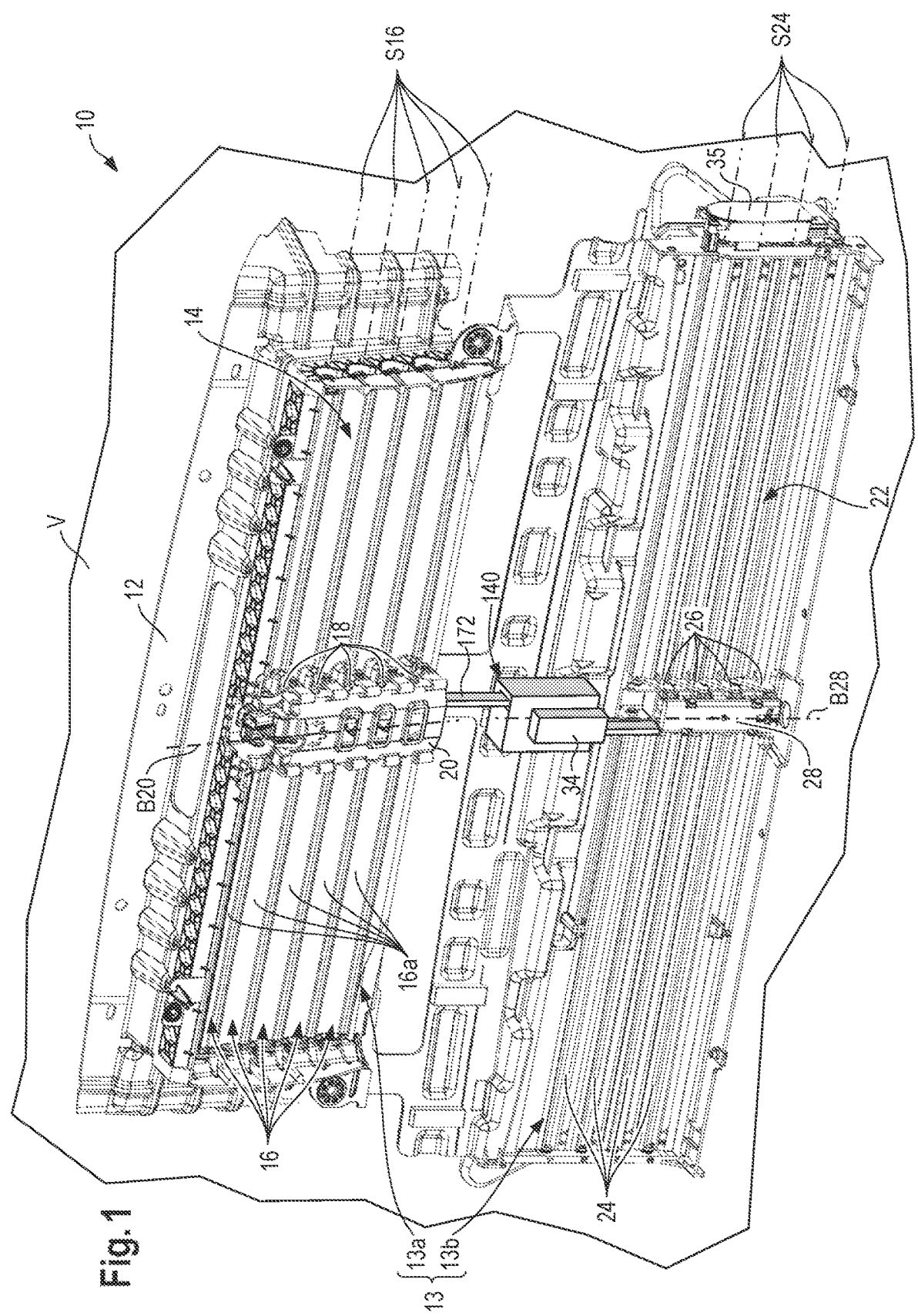
FIG. 1 is a schematic perspective rear view of an air flap apparatus according to the present invention, having the above-described second embodiment of the motion coupling of the present Application, in the blocking operating state.

Referring now to the drawings wherein the showings are for the purpose of illustrating preferred and alternative embodiments of the invention only and not for the purpose of limiting the same, in FIG. 1, an embodiment according to the present invention of an air flap apparatus of the present Application is labeled in general with the number 10. Air flap apparatus 10 encompasses, in a manner known per se, a (for example, injection-molded) air flap frame (or simply "frame") 12, arranged in frame- or body-mounted fashion on vehicle V, in which an air passthrough opening 13, having two parts in the example depicted, having an upper partial opening 13a and a lower partial opening 13b, is embodied.

In accordance with the present Application, the frame is regarded as a stationary component of air flap apparatus 10 and is thus intended to serve as a stationary reference system for describing the movable components of air flap apparatus 10 which are mounted on frame 12, and their motion.

Upper partial opening 13a, constituting a first portion of air passthrough opening 13, is divided at its transverse center by a vertical frame strut (not visible in FIG. 1). The left part of upper partial opening 13a is spanned by five mutually parallel air flaps 16 that are in their blocking position in FIG. 1. The right part of upper partial opening 13a is likewise spanned by five first air flaps 16 that are in their blocking position. First air flaps 16 constitute a first air flap arrangement 14.

Lower partial opening 13b, constituting a second portion of air passthrough opening 13, is also divided at its transverse center by a vertical frame strut (not visible in FIG. 1), the right and left parts of lower partial opening 13b each being spanned by four mutually parallel second air flaps 24 that are also in their closed position as depicted in FIG. 1. Second air flaps 24 constitute a second air flap arrangement 22.

First air flaps 16 are pivotable together, around mutually parallel pivot axes S16, between the blocked position shown in FIG. 1 and a passthrough position that opens upper partial opening 13a for air to flow through. In the example depicted, all pivot axes S16 are parallel and preferably lie in one common plane.

Second air flaps 24 as well are pivotable together, around mutually parallel pivot axes S24, between the closed position shown in FIG. 1 and an open position that opens lower partial opening 13b for air to flow through. In the example depicted, pivot axes S24 also lie in a common plane. In the example depicted, the respective planes of pivot axes S16 and S24 are not coplanar but instead enclose an angle around a tilt axis parallel to pivot axes S16 and S24. This need not be the case in principle, but is defined by the conformation of motor vehicle V at whose front end air flap apparatus 10 is arranged.

In the blocking operating state of air flap apparatus 10 which is shown in FIG. 1, partial openings 13a and 13b of air passthrough opening 13 are substantially closed, so that air flowing from outside onto the respective air flaps 16 and 24, for instance due to wind blast in a context of forward travel, is prevented from flowing through air passthrough opening 13. In the passthrough position, conversely, it is possible for flow to occur through upper partial opening 13a. In the open position, a flow through lower partial opening 13b is possible. In a passthrough operating state of air flap apparatus 10, first air flap arrangement 14 is in its passthrough position and second air flap arrangement 22 is in its open position.

First air flaps 16 are each coupled relatively pivotably, via an articulation lever 18 rigidly connected to the respective flap blade 16a of first air flaps 16, to a first connecting flange 20 for displacement motion together.

Second air flaps 24 as well are each coupled relatively pivotably, via an articulation lever 26 rigidly connected to the respective flap blade (not individually depicted) of second air flaps 24, to a second connecting flange 28 for displacement motion together.

First air flaps 16 and second air flaps 24, including their bearing configurations, are preferably manufactured in one piece as an injection-molded component.

Coupling struts 20 and 28 are displaceable along respective translational paths B20 and B28; in the example depicted, path B20 of upper coupling strut 20 and path B28 of lower coupling strut 28 enclose the same angle between them as do the common planes of pivot axes S16 and S24.

Air flap apparatuses are to this extent known.

The air flap apparatus further comprises a common motion drive system 34 in the preferred form of a direct-current electric motor, by way of which both air flap arrangements 14 and 22 can be driven for a displacement motion between the individual operating positions of first air flaps 16 and second air flaps 24.

In order to allow first and second air flap arrangements 14 and 22 to be driven for a displacement motion separately from one another by way of one and the same motion drive system 34, motion drive system 34 is coupled to the two air flap arrangements 14 and 22 with interposition of a motion coupling 140.

Motion drive system 34 comprises a rotatable output shaft (not depicted) that is concealed by the housing of motion drive system 34 and extends to motion coupling 140.

A sensor apparatus 35, which is arranged on frame 12 and is coupled to second air flap arrangement 22, and which detects the air flap position of second air flaps 24 of second air flap arrangement 22 and outputs it to a vehicle control system, is depicted by way of example. A sensor apparatus of the same kind can also be provided on first air flap arrangement 14.

Figure 2:
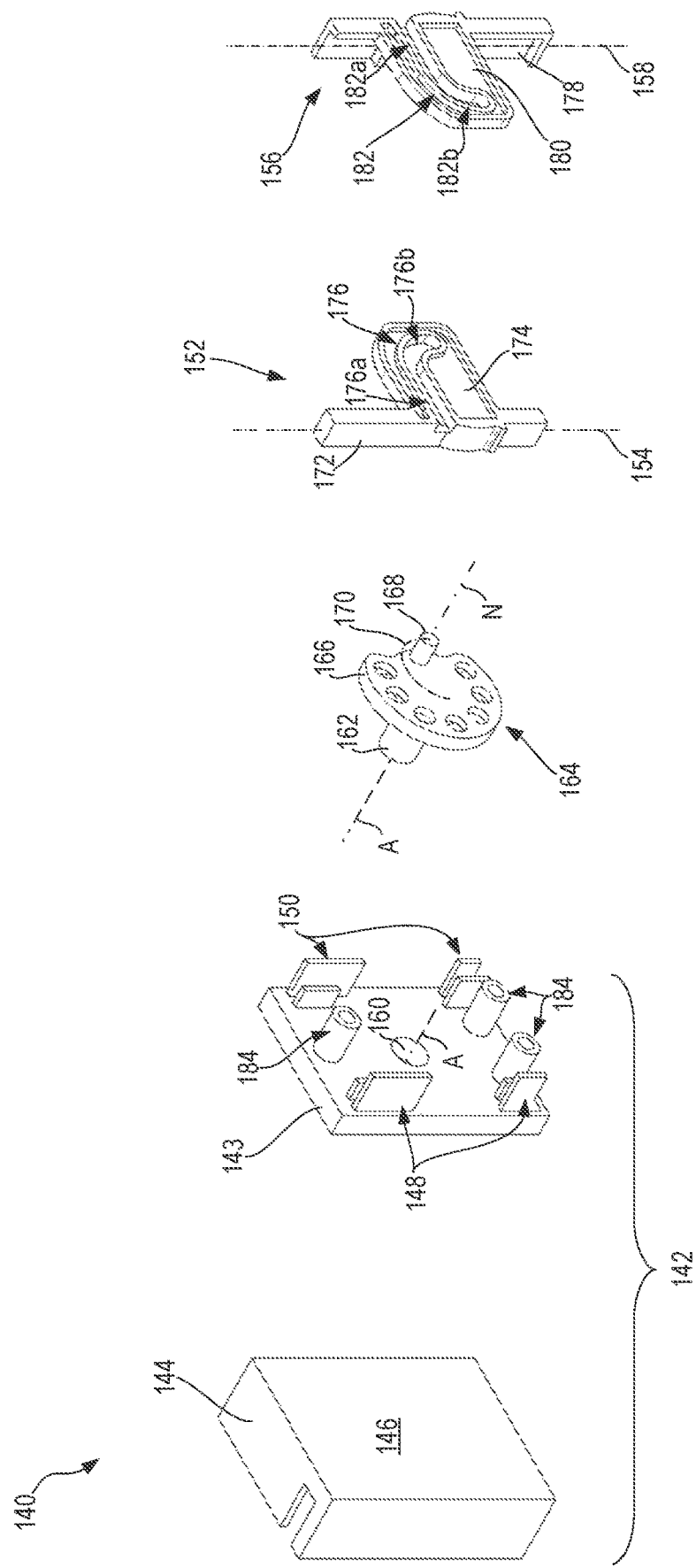
FIG. 2 is a schematic perspective exploded view of the second embodiment, of the motion coupling of FIG. 1 which is recited in the introduction to the description.

FIG. 2 shows a housing 142 encompassing a housing base 143 facing toward the viewer in FIG. 1 and a housing shell 144 that is fastened with its end surface 146 on frame 12.

Housing base 143, which is preferably embodied as an injection-molded component, comprises, on its side that is covered by housing shell 144 in the completely installed state, guidance configurations 148 and 150, of which guidance configuration 148 guides first counterpart coupling component 152 for a translational displacement motion along a rectilinear motion path 154, and guidance configuration 150 guides second counterpart coupling component 156 for a translational displacement motion along a rectilinear motion path 158 that is parallel to motion path 154.

Housing base 143 is furthermore passed through by an opening 160 in which a stub hub 162 of coupling component 164 is guided for rotation around drive axis A. Drive axis A of coupling component 164 is also a drive axis of motion drive system 34, so that preferably a drive shaft of motion drive system 34 is directly torque-transferringly coupled to the coaxial stub hub 162 for rotational motion together.

Coupling component 164 comprises, axially adjacently to stub hub 162, a disk portion 166 on which a cam 168 is arranged eccentrically with respect to drive axis A. Cam 168 extends along a longitudinal cam axis N that is arranged parallel to drive axis A and with a spacing therefrom. Cam 168 consequently describes, during the operation of motion coupling 140 as intended, a circle-segment-shaped, more precisely semicircular, cam path 170.

First counterpart coupling component 152 comprises an actuation portion 172 and a control portion 174. Control portion 174 comprises a gate path 176 that is embodied as a passthrough hole passing through control portion 164 and is passed through by cam 168 during operation. Gate path 176 has a substantially rectilinearly extending displacement portion 176a located closer to actuation portion 172, and a standstill portion 176b adjoining displacement portion 176a at a longitudinal end thereof that is remote from actuation portion 172. Standstill portion 176b has a quarter-circle course and coincides with the right half (in FIG. 2) of the semicircular cam path 170. When cam 168 is located in standstill portion 176b, a motion of cam 168 along cam path 170 does not produce any displacement of first counterpart coupling component 152 relative to housing 142. When cam 168 is located in displacement portion 176a, however, a motion of cam 168 along cam path 170, more precisely along the left (in FIG. 2) quarter-circle, produces a displacement of first counterpart coupling component 152 along first motion path 154.

Second counterpart coupling component 156 is of substantially similar construction. It too encompasses an actuation portion 178 and a control portion 180. Once again there is embodied in control portion 180 a gate path 182 that is embodied as a passthrough hole passing through control portion 180, which path in turn comprises a displacement portion 182a located closer to actuation portion 178 and a standstill portion 182b adjoining displacement portion 182a and located farther from actuation portion 178. Gate paths 176 and 182 of the two control portions 174 and 180 are embodied in terms of their course mutually mirror-symmetrically with respect to a mirror symmetry plane that contains drive axis A and is parallel to motion paths 154 and 158. But because control portions 174 and 180 are moved in different motion spaces, control portions 174 and 180 are arranged behind one another with respect to longitudinal cam axis N. This arrangement behind one another of course also applies to gate paths 176 and 182.

Displacement portion 182a of gate path 182 thus also has a rectilinear course, while standstill portion 182b has a quarter-circle course. Standstill portion 182b coincides with the left half (in FIG. 2) of the semicircular cam path 170.

In the example depicted, displacement portions 176a and 182a extend orthogonally to the respective associated motion paths 154 and 158.

It must be added that projecting from housing base 143 are not only guidance configurations 148 and 150, but also motion end stops 184 that limit the motion space of control portions 174 and 180, and thus of counterpart coupling components 152 and 160 as a whole, along motion path 154 and 158.

Figure 3:
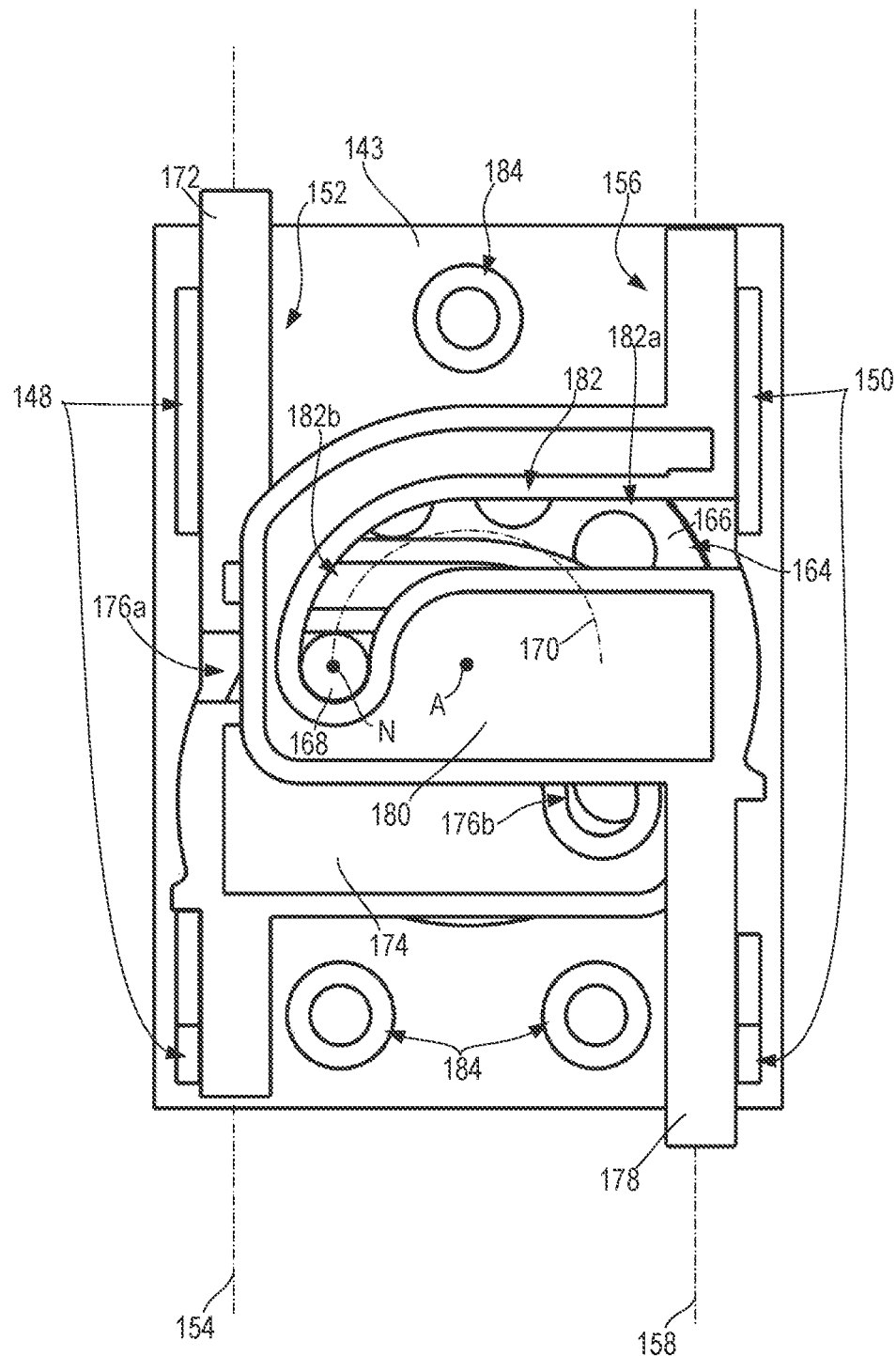
FIG. 3 is a schematic plan view of the second embodiment of the motion coupling, in an operating position in which the air flap apparatus is in the blocking operating state shown in FIG. 1.
Figure 4:
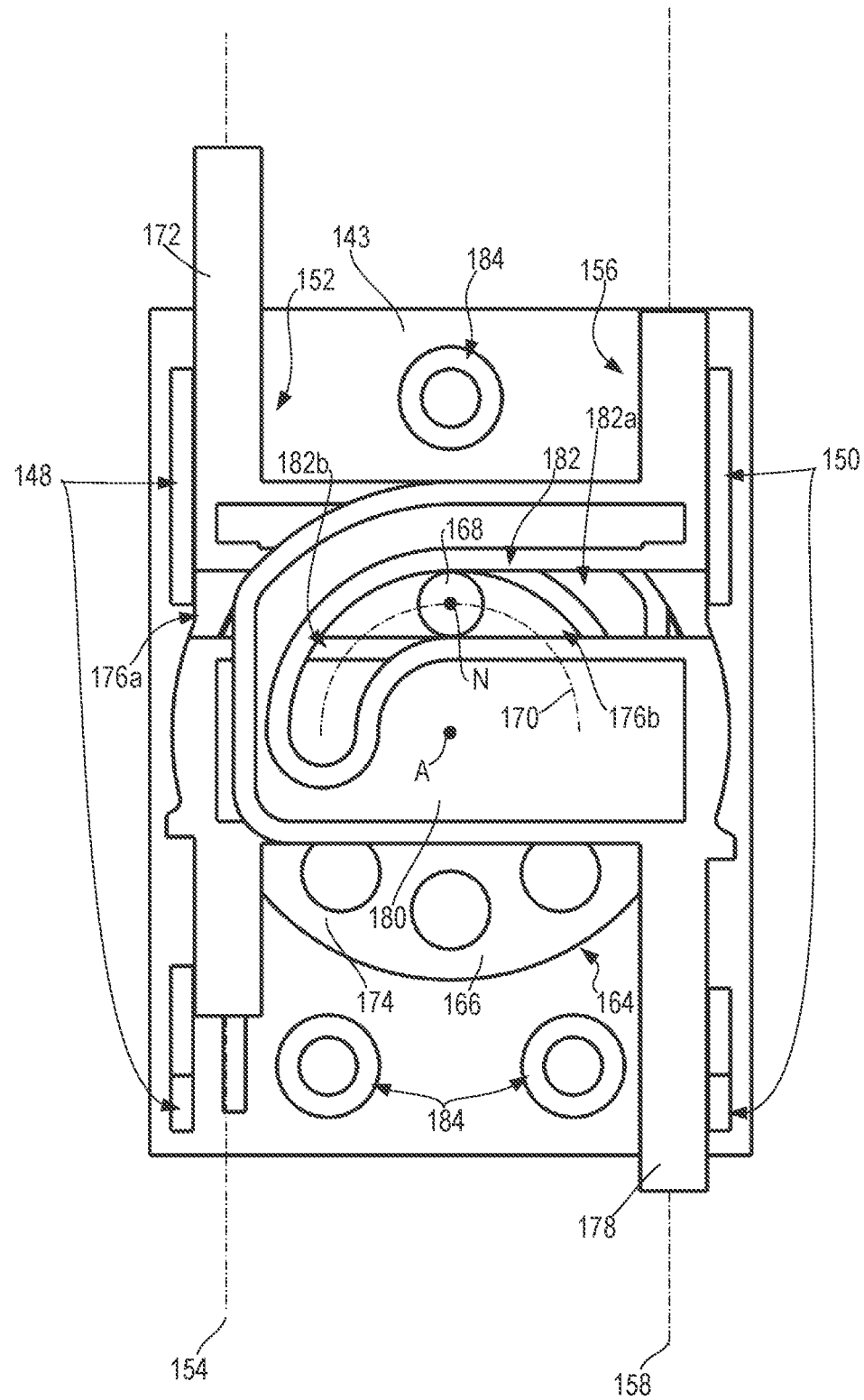
FIG. 4 is the schematic plan view of the motion coupling as in FIG. 3, in an operating position in which the first air flap arrangement is in the passthrough position and the second air flap apparatus is in the blocking position.
Figure 5:
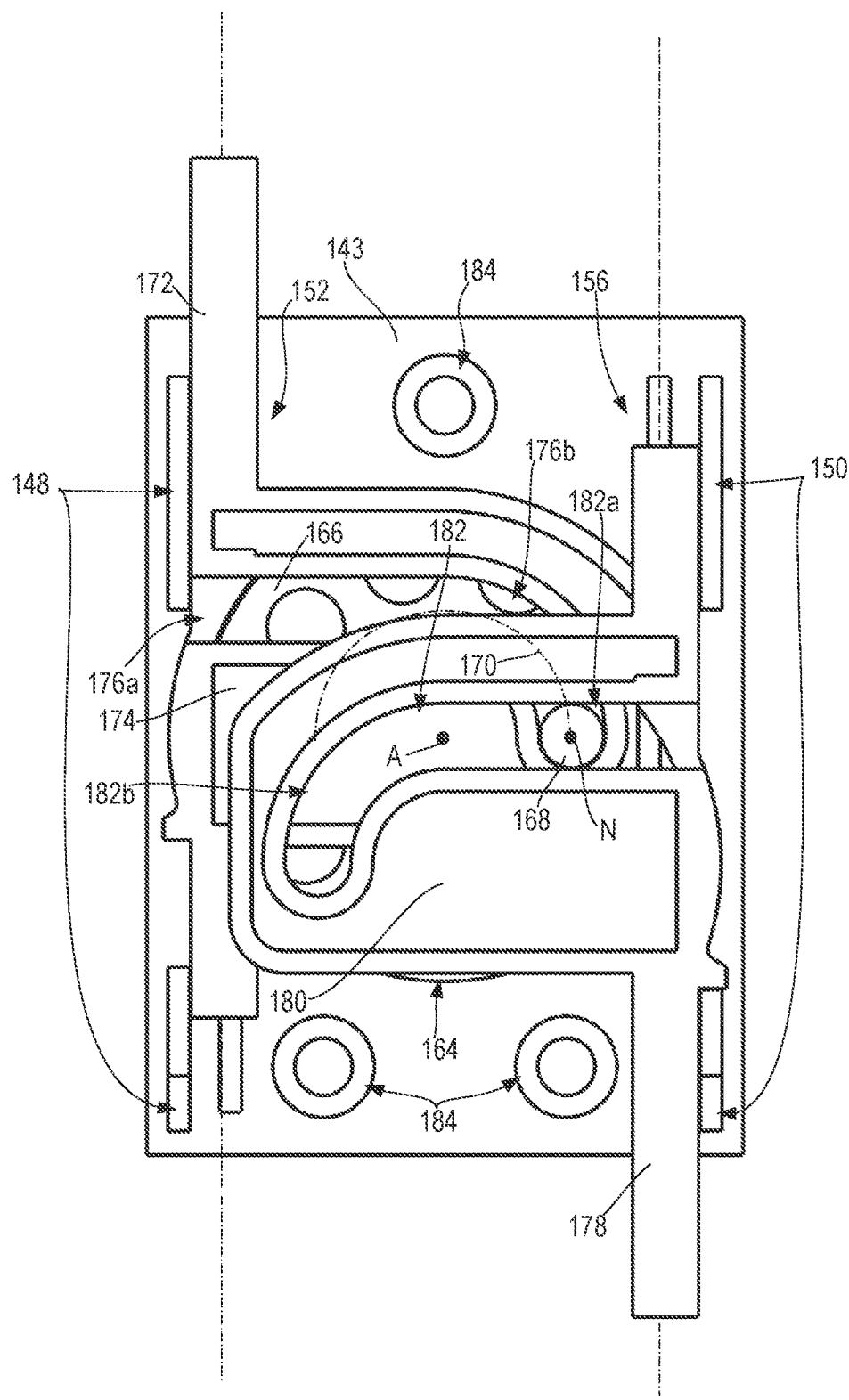
FIG. 5 is the schematic plan view of the motion coupling as in FIGS. 3 and 4, in an operating position in which the air flap apparatus is in a passthrough operating state.

FIGS. 3 to 5 depict the transition from the blocking operating state of air flap apparatus 10 shown in FIG. 1, in which first air flap arrangement 14 is in the blocking position and second air flap arrangement 22 is in the closed position, by way of a motion of cam 168 along the semicircular cam path 170, into the passthrough operating state of air flap apparatus 10 in which first air flap arrangement 14 is in the passthrough position and second air flap arrangement 22 is in the open position.

In the middle of the cam motion, i.e. once a quarter-circle arc of cam path 170 has been traveled, first air flap arrangement 14 is in the passthrough position whereas second air flap arrangement 22 is still in the closed position. An asynchronous displacement of the respective first and second air flap arrangements 14 and 22 between their respective operating positions thus becomes possible.

As is evident from FIGS. 3 to 5, as long as cam 168 is in engagement with displacement portion 176a of first counterpart coupling component 152, it is in engagement with standstill portion 182b of second counterpart coupling component 156. Likewise, as long as cam 168 is in engagement with standstill portion 176b of first counterpart coupling component 152, it is in engagement with displacement portion 182a of second counterpart component 156.

The asynchronicity in the motion sequence of the respective first and second air flap arrangements 14 and 22 is thus bidirectional, regardless of the shifting direction of the operating state of air flap apparatus 10 between its two aforesaid operating states.

Figure 6:
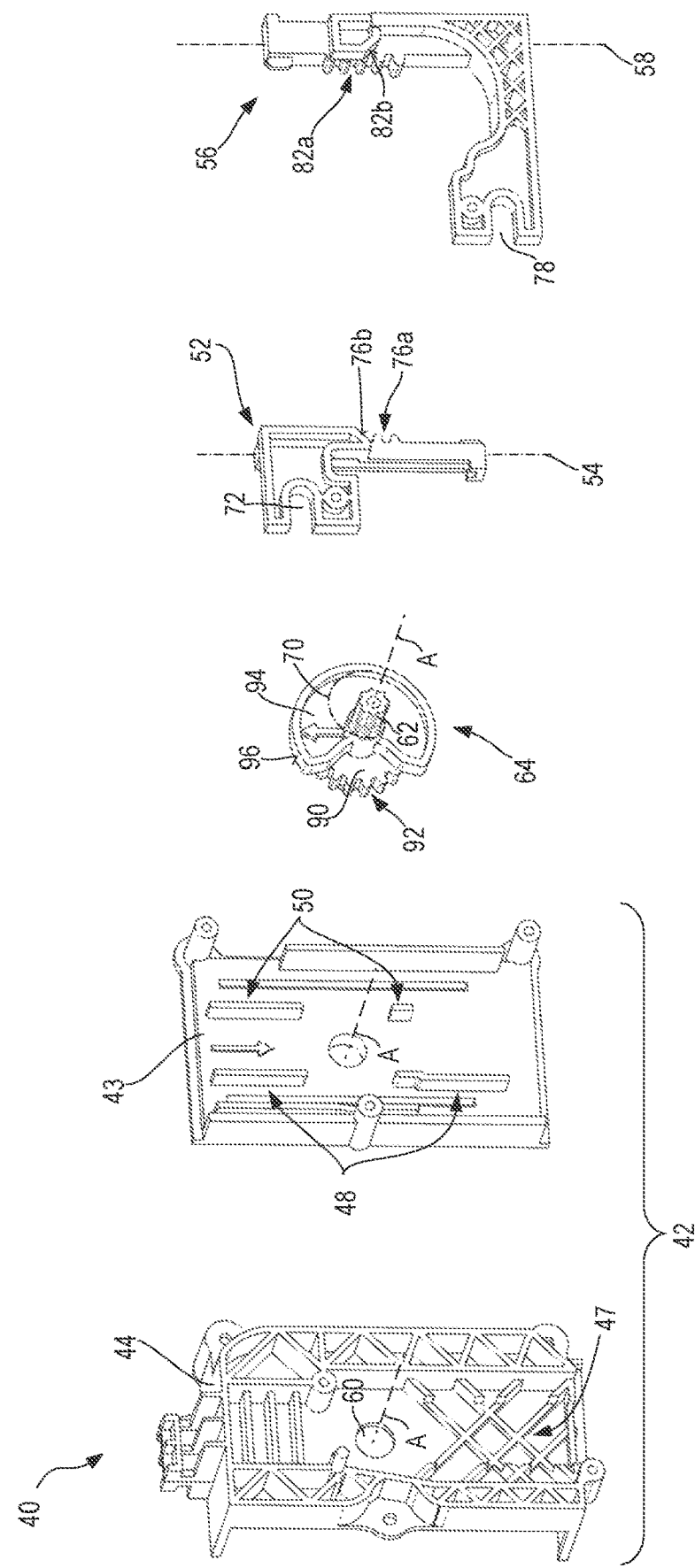
FIG. 6 is a schematic perspective exploded view, corresponding to the view of FIG. 2, of the first embodiment of the motion coupling which is recited in the introduction to the description.

FIG. 6 shows the first embodiment recited in the introduction to the description. Components and component portions that are identical and functionally identical to those in the second embodiment depicted in FIGS. 2 to 5 are labeled below with the same reference characters, but decremented by 100. The first embodiment will be described below only insofar as it differs from the second embodiment of FIGS. 2 to 5.

Motion coupling 40 of FIG. 6 is depicted rotated 180° as compared with that of FIG. 2. The viewer of FIG. 6 is looking at receiving space 47, which is embodied in the outer side of housing shell 44 in order to receive motion drive system 34. Motion coupling 40 is therefore fastenable on frame 12 of air flap apparatus 10 not with housing shell 44 but with housing base 43 facing toward frame 12. Housing shell 44 accordingly comprises recess 60, through which stub hub 62 extends for connection to motion drive system 34 in the assembled, operationally ready state.

Coupling component 64 faces toward the viewer with stub hub 62.

Coupling component 64 is likewise embodied and arranged to travel along a semicircular motion path around drive axis A in order to shift air flap apparatus 10 between its blocking operating state and its passthrough operating state.

Coupling component 64 comprises, adjacently in an axial direction with respect to drive axis A, a sector gear 90 that constitutes a motion coupling configuration and has a tooth set 92 embodied thereon, as well as a blockade coupling configuration 94 having a partly cylindrical cam surface 96. Drive axis A is both a gear axis and a cylinder axis of cam surface 96. Because of the arrangement of sector gear 90 and blockade coupling configuration 94 in axial proximity to one another, tooth set 92 does not travel into the motion space of cam surface 96, and vice versa.

Tooth set 92, and sector gear 90 as a whole, are preferably embodied in the angular region in which blockade coupling configuration 94 is not embodied, and vice versa. It is thereby possible for tooth set 92, upon a rotation of coupling configuration 64 around drive axis A, to come into engagement successively in time with tooth sets 76a and 82 constituting the respective counterpart motion configurations of first and second counterpart coupling components 52 and 56.

Cam surface 96 thus extends in a circumferential direction around drive axis A on both sides of tooth set 92, respectively adjacently thereto in a circumferential direction.

In the present case, cam surface 96 extends over approximately 260° to 270°, and the tooth set extends over approximately 85 to 100°.

One physical difference between counterpart coupling components 52 and 58 of this embodiment and those counterpart coupling components 152 and 158 of the previously described embodiment is that actuation portions 72 and 78 protrude laterally orthogonally to the respective unmodifiedly parallel translational motion paths 54 and 58. The two respective actuation portions 72 and 78 of counterpart coupling components 52 and 56 protrude toward the same side of housing 42.

First counterpart coupling component 52 comprises, likewise in different motion spaces, a tooth set 76a and a negative partly cylindrical contact surface 76b, tooth set 76a being embodied as a rectilinear toothed rack for meshing engagement with tooth set 92 of sector gear 90. When tooth set 92 of sector gear 90 is in engagement with tooth set 76a of first counterpart coupling component 52, a rotation of the sector gear, or of coupling component 64 in general, around drive axis A brings about a translational displacement of first counterpart coupling component 52 along its motion path 54. Actuation portion 72 of first counterpart coupling component 72 is thereby also translationally shifted.

In the completely installed state, the negatively partly cylindrical contact surface 76b, constituting a first counterpart blockade configuration that is embodied for sliding abutting engagement with cam surface 96, is axially adjacent to tooth set 76a, axially with reference to drive axis A. Because of the axial offset, tooth set 76a and contact surface 76b are arranged in different motion spaces.

Second counterpart coupling component 56 is embodied similarly and comprises a tooth set 82a, embodied as a toothed rack, for meshing engagement with tooth set 92 of sector gear 90, as well as a negative partly cylindrical contact surface 82b that is embodied as a second counterpart blockade configuration for sliding abutting engagement with cam surface 96.

When one of contact surfaces 76b or 82b is in sliding abutting engagement with cam surface 96, blockade coupling configuration 94 that carries cam surface 96 prevents a displacement of the respective counterpart coupling component 52 or 56, carrying the respective contact surface 76b or 82b, along the associated motion path 54 or 58 in the direction in which the relevant contact surface is facing.

Figure 7:
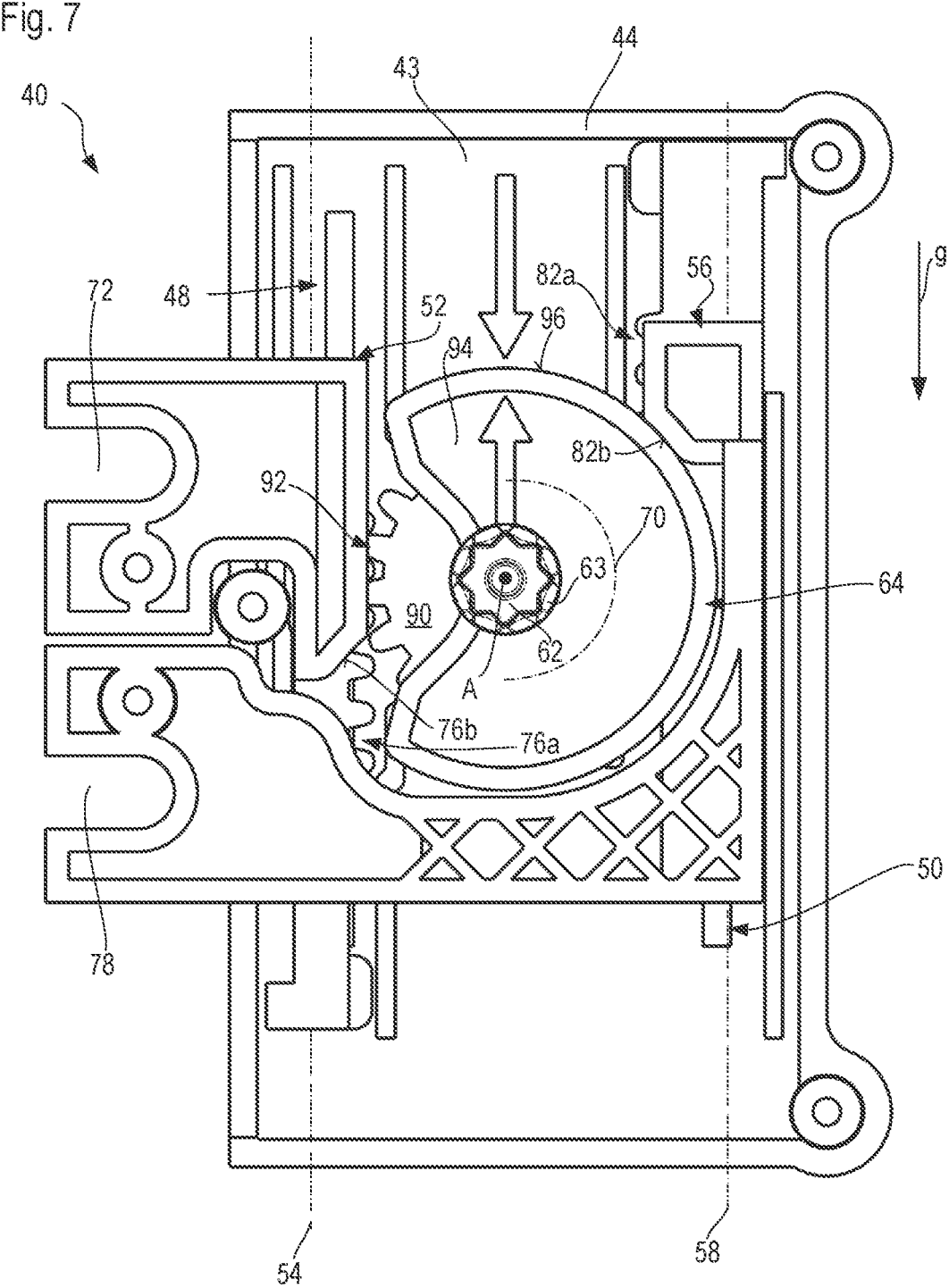
FIG. 7 is a schematic plan view, corresponding to the view of FIG. 3, of the first embodiment of the motion coupling in an operating position in which the air flap apparatus is in the blocking operating state shown in FIG. 1.
Figure 8:
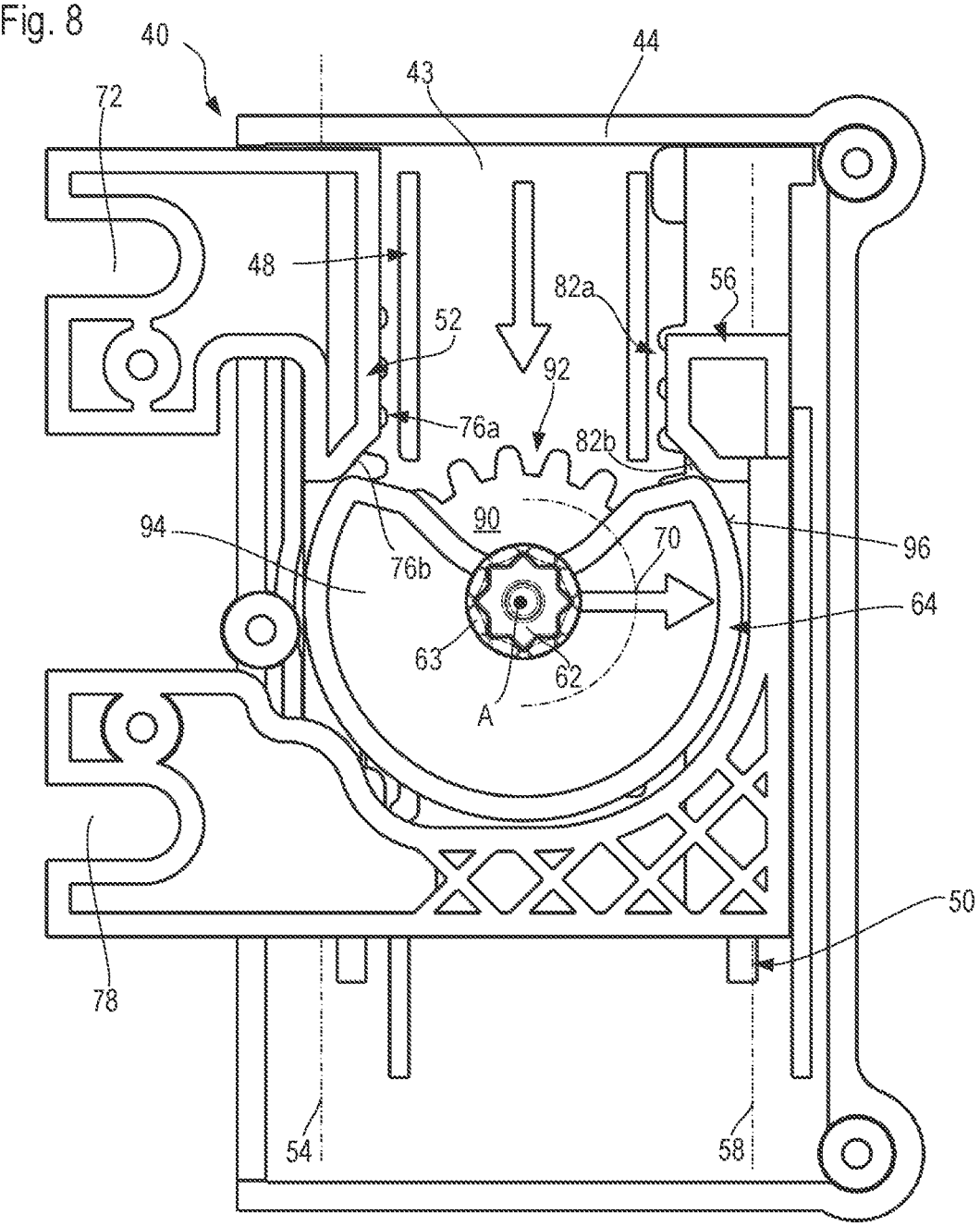
FIG. 8 is a schematic plan view, corresponding to the view of FIG. 4, of the motion coupling of FIG. 7 in an operating position in which the first air flap arrangement is in the passthrough position and the second air flap arrangement is in the blocking position.
Figure 9:
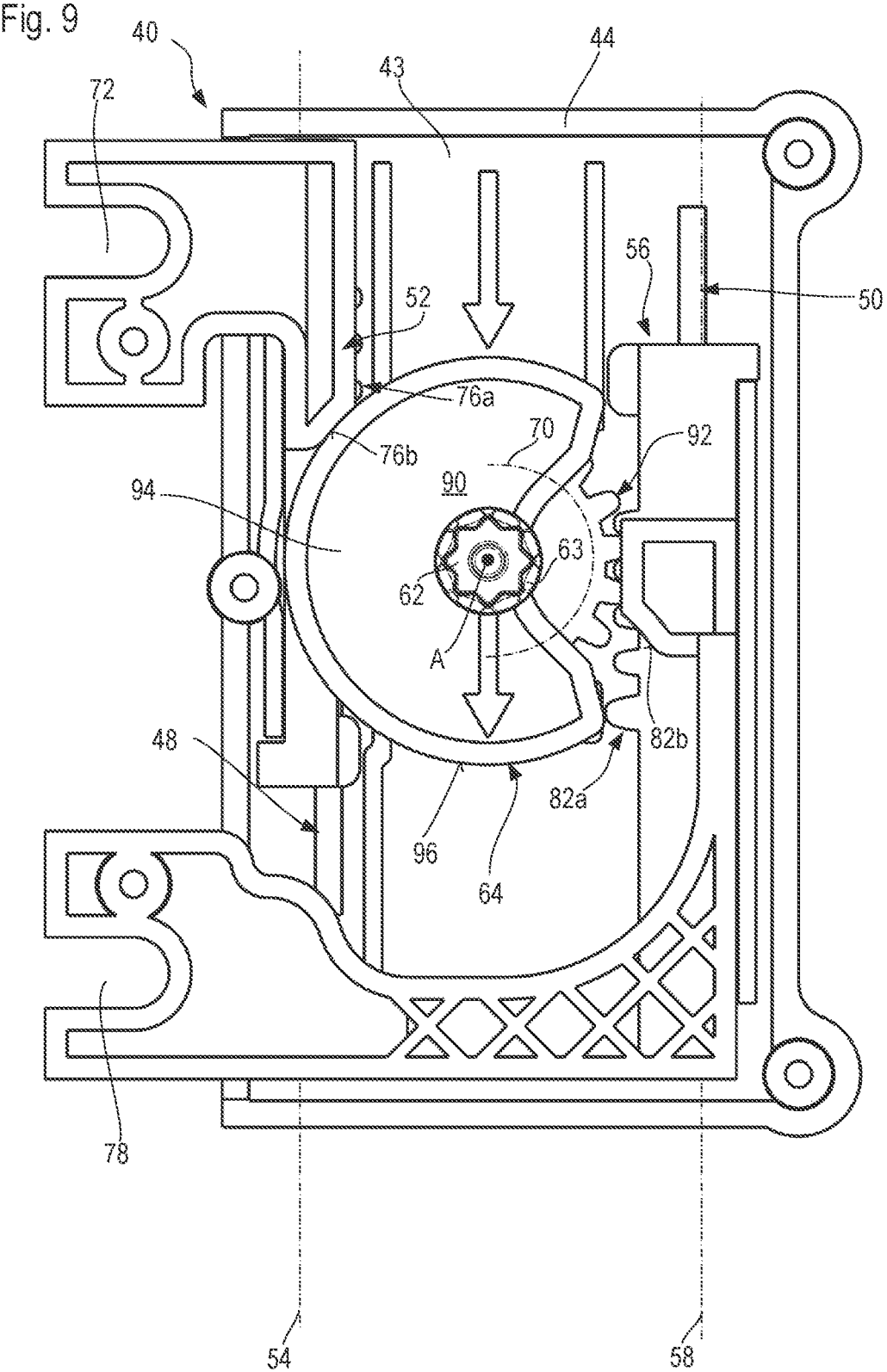
FIG. 9 is a schematic plan view, corresponding to the view of FIG. 5, of the motion coupling of FIGS. 7 and 8 in an operating position in which the air flap apparatus is in the passthrough operating state.

In FIGS. 7 to 9, corresponding to FIGS. 3 to 5, motion coupling 40 is shown during a transition between a blocking operating state of air flap apparatus 10 which corresponds to the depiction of motion coupling 40 in FIG. 7, and a passthrough operating state of air flap apparatus 10 which corresponds to the depiction of motion coupling 40 in FIG. 9.

Arrows on coupling configuration 64 and on housing base 43 illustrate the respective relative position of coupling component 64 with respect to housing 42. Coupling component 64 executes a 180° rotation around rotation axis A. A path curve 70 illustrating this motion extends in FIGS. 7 to 9 between the respective end positions of the arrow embodied on coupling component 64.

In FIG. 7, tooth set 92 of sector gear 90 is in meshing engagement with tooth set 76a of first counterpart coupling component 52. Contact surface 82b of second counterpart coupling component 56 is in abutting engagement with cam surface 96, so that blockade coupling configuration 94, constituting a physical barrier, prevents second counterpart coupling component 56 from being displaced by gravity in the effective direction of gravity g extending parallel to motion path 58.

Actuation portions 72 and 78 are in positive engagement with transfer linkages (not depicted in the Figures) that transfer a motion of actuation portions 72 and 78 to the respective air flap arrangements 14 and 22. Actuation portion 72 is coupled to first air flap arrangement 14, and actuation portion 78 to second air flap arrangement 22.

When sector gear 90 is rotated 90° clockwise proceeding from the position shown in FIG. 7, the first counterpart coupling component 52 will move upward in FIG. 7 along the associated motion path 54 as a result of the meshing engagement of tooth sets 92 and 76a. The state that is then achieved is depicted in FIG. 8. As a result of the rotation of coupling component 64, and thus of sector gear 90, through a quarter-circle, first air flap arrangement 14 has been displaced from the blocked position into the passthrough position. Second air flap arrangement 22, however, has remained in the closed position.

In the operating position of motion coupling 40 shown in FIG. 8, both contact surfaces 76*b* and 82*b* are respectively braced against the circumferential ends of blockade coupling configuration 94 which are respectively closest to them, so that blockade coupling configuration 94 prevents both first counterpart coupling component 52 and second counterpart coupling component 56 from being moved downward in FIG. 8 by gravity along their associated respective motion path 54 or 58. In FIG. 8, sector gear 90 is not in engagement with either tooth set 76*a* or 82*a* of the respective first or second counterpart coupling component 52 or 56.

When coupling component 64 is rotated a further 90° clockwise proceeding from the position shown in FIG. 8, coupling component 64 reaches its other end position that is shown in FIG. 9. Tooth set 92 of sector gear 90 then comes into meshing engagement with tooth set 82*a* of second counterpart coupling component 56 and moves it downward along its motion path 58.

Contact surface 76*b* of first counterpart coupling component 52 has likewise come into sliding abutting engagement with cam surface 96, so that blockade coupling configuration 94 physically prevents a gravity-driven displacement of coupling component 64 out of the position already reached in FIG. 8. In FIG. 9, first air flap arrangement 14 is consequently still in its passthrough position, and second air flap arrangement 22 is now in its open position.

The end face of hollow shaft 63 of motion drive system 34 is visible around stub hub 62 in FIGS. 7 to 9.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. An air flap apparatus for a motor vehicle, encompassing:
   a frame having an air passthrough opening;
   a first air flap arrangement encompassing at least two first air flaps arranged displaceably relative to the frame synchronously together;
   a second air flap arrangement, different from the first air flap arrangement and functionally spaced from the first air flap arrangement, encompassing at least two second air flaps arranged displaceably relative to the frame synchronously together;
   a common motion drive system for displacing the first and the second air flap arrangement;
   a motion coupling for coupling both the first and the second air flap arrangement to the motion drive system, the first air flap arrangement being displaceable between a blocking position having a greater degree of coverage of a first portion of the air passthrough opening and a passthrough position having a lesser degree of coverage of the first portion of the air passthrough opening;
   the second air flap arrangement being displaceable between a closed position having a greater degree of coverage of a second portion, different from the first, of the air passthrough opening and an open position having a lesser degree of coverage of the second portion of the air passthrough opening;
   the motion coupling coupling the first and the second air flap arrangement to the motion drive system in such a way that the first and the second air flap arrangement are drivable by the motion drive system asynchronously for a displacement motion between a blocking operating state in which the first air flap arrangement is in the blocking position and the second air flap arrangement is in the closed position, and a passthrough operating state in which the first air flap arrangement is in the passthrough position and the second air flap arrangement is in the open position,
   the motion coupling encompassing:
   a coupling component connected to an output member of the motion drive system for motion together;
   a first counterpart coupling component that is force- and motion-transferringly coupled to the coupling component and is connected to the first air flap arrangement for motion together; and
   a second counterpart coupling component that is force- and motion-transferringly coupled to the coupling component and is connected to the second air flap arrangement for motion together wherein the second counterpart coupling component is movable relative to the first counterpart coupling component,
   wherein the coupling component comprises a common motion coupling configuration that, during a shifting of the air flap apparatus between the blocking operating state and the passthrough operating state, is force- and motion-transferringly coupled both to the first and to the second counterpart coupling component in order to produce a first displacement of the first air flap arrangement between the blocking position and the passthrough position, and to produce a second displacement of the second air flap arrangement between the closed position and the open position, the first displacement being at least partially asynchronous to the second displacement.

2. The air flap apparatus according to claim 1, wherein during the shifting of the air flap apparatus between the blocking operating state and the passthrough operating state, the motion coupling configuration successively comes into a force- and motion-transferring coupling engagement firstly with one counterpart coupling component from among the first and the second counterpart coupling component, and then with the respective other counterpart coupling component.

3. The air flap apparatus according to claim 2, wherein the coupling engagement with the one counterpart coupling component ends before the coupling engagement with the other counterpart coupling component begins.

4. The air flap apparatus according to claim 2, wherein the coupling component comprises a common blockade coupling configuration that is in a blockade engagement, which blocks a motion of the other counterpart coupling component, with the other counterpart coupling component, while the motion coupling configuration is in coupling engagement with the one counterpart coupling component, and vice versa.

5. The air flap apparatus according to claim 1, wherein the coupling component is movable rotationally around a drive axis.

6. The air flap apparatus according to claim 4, wherein the coupling component is movable rotationally around a drive axis, and wherein the motion coupling configuration and the blockade coupling configuration are arranged behind one another along the drive axis.

7. The air flap apparatus according to claim 4, wherein the coupling component is movable rotationally around a drive axis, and wherein the blockade coupling configuration comprises a cam surface that is, in portions, rotationally symmetrical with respect to a rotational symmetry axis and does not extend entirely around the rotational symmetry axis, the drive axis being the rotational symmetry axis.

8. The air flap apparatus according to claim 5, wherein the motion coupling configuration encompasses a sector gear extending along an angle sector around the drive axis.

9. The air flap apparatus according to claim 7, wherein the motion coupling configuration encompasses a sector gear extending along an angle sector around the drive axis, and wherein the sector gear extends for the most part over an angular region over which the cam surface does not extend, and vice versa.

10. The air flap apparatus according to claim 9, wherein the first counterpart coupling component comprises a first counterpart cam surface for abutting engagement with the cam surface, and a first tooth set for meshing engagement with the sector gear; and the second counterpart coupling component comprises a second counterpart cam surface for abutting engagement with the cam surface, and a second tooth set for meshing engagement with the sector gear; the first and the second tooth set being arranged on different sides of the drive axis along parallel motion paths.

11. The air flap apparatus according to claim 7, wherein the motion coupling configuration encompasses a sector gear extending along an angle sector around the drive axis, and wherein the first counterpart coupling component comprises a first counterpart cam surface for abutting engagement with the cam surface, and a first tooth set for meshing engagement with the sector gear; and the second counterpart coupling component comprises a second counterpart cam surface for abutting engagement with the cam surface, and a second tooth set for meshing engagement with the sector gear; the first and the second tooth set being arranged on different sides of the drive axis along parallel motion paths.

12. The air flap apparatus according to claim 1, wherein the motion coupling configuration is in a force- and motion-transferring coupling engagement both with the first and with the second counterpart coupling component during much of the time span of the shifting of the air flap apparatus between the blocking operating state and the passthrough operating state.

13. The air flap apparatus according to claim 1, wherein the motion coupling configuration is in a force- and motion-transferring coupling engagement both with the first and with the second counterpart coupling component during the entire time span of the shifting of the air flap apparatus between the blocking operating state and the passthrough operating state.

14. The air flap apparatus according to claim 12, wherein the motion coupling configuration comprises a cam that is movable along a predetermined cam path and that engages into a respective gate path of both the first and the second counterpart coupling component, each gate path comprising a standstill portion whose course corresponds to that portion of the course of the cam path which the cam passes through during its engagement with the standstill portion, and a displacement portion whose course differs from the course of that portion of the cam path which the cam passes through during its engagement with the displacement portion, the standstill portions of the first and the second counterpart coupling component being arranged with an offset relative to one another in such a way that the cam passes through the standstill portions successively during its motion along the cam path.

15. The air flap apparatus according to claim 14, wherein the cam enters the standstill portion of the one counterpart coupling component from among the first and the second counterpart coupling component only when it is leaving the standstill portion of the other counterpart coupling component or only after it has left the standstill portion of the other counterpart coupling component.

16. The air flap apparatus according to claim 14, wherein the cam extends along a longitudinal cam axis extending transversely to the cam path, the gate paths of the first and the second counterpart coupling component being arranged behind one another along the longitudinal cam axis.

17. The air flap apparatus according to claim 16, wherein with respect to the longitudinal cam axis, the standstill portion of the one counterpart coupling component from among the first and the second counterpart coupling component is axially adjoined by the displacement portion of the respective other counterpart coupling component, and vice versa.

18. The air flap apparatus according to claim 1, wherein the first and the second counterpart coupling component are each translationally displaceable respectively along a first and a second motion path.

19. The air flap apparatus according to claim 18, wherein the first and the second motion path are mutually parallel or coaxial.

20. An air flap apparatus for a motor vehicle, encompassing:
  a first frame portion having a first air passthrough opening;
  a second frame portion having a second air passthrough opening that is spaced from the first passthrough opening;
  a first air flap arrangement encompassing at least one first air flap arranged displaceably relative to the first frame portion;
  a second air flap arrangement encompassing at least one second air flap arranged displaceably relative to the second frame portion;
  a common motion drive system between the first and second frame portions for displacing the first and the second air flap arrangement;
  a motion coupling for coupling both the first and the second air flap arrangement to the motion drive system,
  the first air flap arrangement being displaceable between a blocking position having a greater degree of coverage of the first air passthrough opening and a passthrough position having a lesser degree of coverage of the first passthrough opening;
  the second air flap arrangement being displaceable between a closed position having a greater degree of coverage of the second air passthrough opening and an open position having a lesser degree of coverage of the second air passthrough opening;
  the motion coupling coupling the first and the second air flap arrangement to the motion drive system in such a way that the first and the second air flap arrangement are drivable by the motion drive system asynchronously for a displacement motion between a blocking operating state in which the first air flap arrangement is in the blocking position and the second air flap arrangement is in the closed position, and a passthrough operating state in which the first air flap arrangement is in the passthrough position and the second air flap arrangement is in the open position, the motion coupling encompassing:

a coupling component connected to an output member of the motion drive system for motion together;

a first counterpart coupling component that is force- and motion-transferringly coupled to the coupling component and is connected only to the first air flap arrangement for motion together; and a second counterpart coupling component that is force- and motion-transferringly coupled to the coupling component and is connected to only the second air flap arrangement for motion together wherein second counterpart coupling component is movable relative to the first counterpart coupling component, wherein the coupling component comprises a common motion coupling configuration that, during a shifting of the air flap apparatus between the blocking operating state and the passthrough operating state, is force- and motion-transferringly coupled both to the first and to the second counterpart coupling component in order to produce a first displacement of the first air flap arrangement between the blocking position and the passthrough position, and to produce a second displacement of the second air flap arrangement between the closed position and the open position, the first displacement being at least partially asynchronous to the second displacement.

* * * * *